US012225356B2

(12) United States Patent
Yang et al.

(10) Patent No.: US 12,225,356 B2
(45) Date of Patent: Feb. 11, 2025

(54) CONNECTOR AND A HEARING DEVICE COMPRISING SAID CONNECTOR

(71) Applicant: GN Hearing A/S, Ballerup (DK)

(72) Inventors: Qi Yang, Chicago, IL (US); Erin O'Neill, Northfield, MN (US); Christian Grønnegaard, Copenhagen (DK); Michalis Papakostas, Chicago, IL (US)

(73) Assignee: GN HEARING A/S, Ballerup (DK)

( * ) Notice: Subject to any disclaimer, the term of this patent is extended or adjusted under 35 U.S.C. 154(b) by 311 days.

(21) Appl. No.: 17/844,737

(22) Filed: Jun. 21, 2022

(65) Prior Publication Data

US 2023/0239637 A1 Jul. 27, 2023

Related U.S. Application Data

(63) Continuation-in-part of application No. 17/581,829, filed on Jan. 21, 2022, now Pat. No. 12,035,111.

(51) Int. Cl.

| | |
|---|---|
| ***H04R 1/10*** | (2006.01) |
| ***H04R 25/00*** | (2006.01) |
| ***H04R 25/02*** | (2006.01) |

(52) U.S. Cl.

CPC ............. *H04R 25/65* (2013.01); *H04R 25/02* (2013.01); *H04R 2225/021* (2013.01)

(58) Field of Classification Search

CPC ............ H04R 1/1016; H04R 2225/021; H04R 2225/0213; H04R 2225/0216; H04R 2225/025; H04R 2460/17

See application file for complete search history.

(56) References Cited

U.S. PATENT DOCUMENTS

| | | | | |
|---|---|---|---|---|
| 4,827,525 A * | 5/1989 | Hotvet | H04R 25/604 | 381/60 |
| 6,105,715 A * | 8/2000 | Knauer | A61F 11/08 | 181/135 |
| 6,345,684 B1 * | 2/2002 | Leight | A61F 11/08 | 181/135 |

(Continued)

FOREIGN PATENT DOCUMENTS

| | | | |
|---|---|---|---|
| DE | 102005058772 B3 * | 3/2007 | H04R 25/652 |
| DE | 20023930 U1 * | 10/2007 | H04R 25/65 |

(Continued)

OTHER PUBLICATIONS

Extended European Search Report for EP Patent Appln. No. 23152111.3 dated May 25, 2023.

*Primary Examiner* — Ryan Robinson

(74) *Attorney, Agent, or Firm* — Vista IP Law Group, LLP

(57) ABSTRACT

Disclosed is a connector for providing sound into an ear canal of a user. The connector is configured to connect a behind-the-ear, BTE, component of a hearing device to an ITE component of the hearing device. The connector comprises a first portion configured to be connected to the ITE component of the hearing device and configured to be at least partly inserted into an ear canal of the user. The first portion is configured to extend at least partly in the ear canal of the user when the connector is in its intended position at the ear of the user. The connector further comprises at least one identifiable marker being a user guide.

15 Claims, 3 Drawing Sheets

(56) References Cited

U.S. PATENT DOCUMENTS

| | | | | |
|---|---|---|---|---|
| 7,720,244 | B2 * | 5/2010 | Espersen | H04R 25/656 381/328 |
| 7,844,065 | B2 * | 11/2010 | von Dombrowski | H04R 25/48 381/328 |
| 8,357,084 | B2 * | 1/2013 | Bachler | A61B 1/227 600/184 |
| 8,411,889 | B2 * | 4/2013 | Naumann | H04R 25/00 381/328 |
| 8,550,206 | B2 * | 10/2013 | Keady | A61F 11/08 181/135 |
| 9,961,458 | B1 * | 5/2018 | Tourdot | H04R 25/652 |
| 10,051,383 | B2 * | 8/2018 | Margot | H04R 25/604 |
| 11,564,042 | B2 * | 1/2023 | Saidi | H04R 25/75 |
| 2009/0087006 | A1 * | 4/2009 | Leong | H04R 25/656 381/328 |
| 2010/0124346 | A1 | 5/2010 | Higgins | |
| 2011/0135131 | A1 * | 6/2011 | Winther | H04R 25/02 381/322 |
| 2012/0237068 | A1 * | 9/2012 | Fretz | H04R 25/656 381/330 |
| 2012/0257774 | A1 * | 10/2012 | Larsen | H04R 25/656 381/328 |
| 2013/0223666 | A1 * | 8/2013 | Michel | H04R 25/00 381/329 |
| 2013/0259279 | A1 * | 10/2013 | Hong | H04R 25/607 381/322 |
| 2014/0016808 | A1 * | 1/2014 | Cherukuri | H04R 25/652 381/324 |
| 2016/0166203 | A1 * | 6/2016 | Goldstein | A61B 5/6817 |
| 2016/0361203 | A1 * | 12/2016 | Khademhosseini | A61M 1/85 |
| 2022/0126028 | A1 * | 4/2022 | Sacherman | A61F 11/00 |
| 2022/0279294 | A1 * | 9/2022 | Xu | H04R 25/658 |
| 2023/0181886 | A1 * | 6/2023 | Zuur | A61M 5/46 604/73 |
| 2023/0236003 | A1 * | 7/2023 | Venkatakrishnan | G01B 5/18 33/512 |

FOREIGN PATENT DOCUMENTS

| | | | | | |
|---|---|---|---|---|---|
| DE | 202015007381 | U1 * | 3/2016 | A44C 15/00 |
| EP | 1755361 | A1 * | 2/2007 | H04R 25/00 |
| EP | 3352479 | A1 | 7/2018 | |
| EP | 3422739 | A1 * | 1/2019 | H04R 25/607 |

* cited by examiner

CONNECTOR AND A HEARING DEVICE COMPRISING SAID CONNECTOR

RELATED APPLICATION DATA

This application is a continuation-in-part of U.S. patent application Ser. No. 17/581,829 filed on Jan. 21, 2022, pending. The entire disclosure of the above application is expressly incorporated by reference herein.

FIELD

The present disclosure relates to a connector for providing sound into an ear canal of a user. The connector is configured to connect a behind-the-ear (BTE) component of a hearing device to an ITE component of the hearing device. Furthermore, the present disclosure relates to a hearing device comprising said connector.

BACKGROUND

Nowadays, there are different types of hearing devices in the market. A popular type of the hearing devices comprises a behind-the-ear (BTE) device and a receiver-in-ear (RIE) device which are connected by e.g. a wire. However, insertion of such RIE device in the ear is often challenging for a user. In particular, insertion of such RIE device is challenging for a new user or for a user with a reduced ability. Therefore, such users may not insert the RIE device in a correct manner. This may result into a suboptimal fit of the hearing device. In addition, the user may not receive an optimum performance of the hearing device designed for the user e.g. to compensate for a hearing loss of the user. Thus, there is a need for an improved hearing device which addresses the abovementioned challenges.

SUMMARY

According to a first aspect, disclosed is a connector for providing sound into an ear canal of a user. The connector is configured to connect a behind-the-ear, BTE, component of a hearing device to an in-the-ear, ITE, component of the hearing device. The connector comprises a first portion. The first portion is configured to be connected to the ITE component of the hearing device. The first portion is configured to be at least partly inserted into an ear canal of the user when the connector is in its intended position at the ear of the user. The first portion is configured to extend at least partly in the ear canal of the user when the connector is in its intended position at the ear of the user. The connector further comprises at least one identifiable marker being a user guide.

The connector is configured to connect a BTE component of a hearing device to an ITE component of the hearing device. The BTE component of the hearing device may be configured to be arranged behind a pinna of the ear of the user of the hearing device. The ITE component may be configured to be arranged in the ear canal of the user of the hearing device. The connector may comprise a flexible member. The connector may have a length in the range of 15 mm to 60 mm. The connector may have a cross-sectional dimension e.g. a diameter in the range of 0.1 mm to 1.5 mm e.g. 0.9 mm. The connector may comprise a first end and a second end, e.g. the flexible member of the connector may have a first end and a second end. The first end of the connector may be configured to be connected to the BTE component of the hearing device. The second end of the connector may be configured to be connected to the ITE component of the hearing device.

The first portion of the connector is configured to be connected to the ITE component of the hearing device. The first portion of the connector may be connected to the ITE component by a plug-and-socket connector or the like.

The first portion of the connector is configured to be at least partly inserted into the ear canal of the user. The first portion of the connector is configured to extend at least partly in the ear canal of the user when the connector is in its intended position at the ear of the user. The first portion of the connector may have a length in the range of 5 mm to 30 mm. The first portion of the connector may be configured such that a portion or a part of the first portion of the connector, having a length in the range of 0.5 mm to 20 mm, may be inserted into the ear canal of the user. The first portion of the connector may be configured such that a portion or a part of the first portion of the connector, having a length in the range of 0.5 mm to 20 mm, may extend in the ear canal of the user when the connector is in its intended position at the ear of the user. The first portion of the connector may be configured such that a portion of the first portion of the connector, having a length in the range of 4.5 mm to 29.5 mm, may not be inserted into the ear canal of the user. The first portion of the connector may be configured such that a portion of the first portion of the connector, having a length in the range of 4.5 mm to 29.5 mm, may extend outside the ear canal of the user when the connector is in its intended position at the ear of the user. The first portion of the connector may be configured to be completely inserted into the ear canal of the user when the connector is in its intended position at the ear of the user. The first portion of the connector may be configured to extend completely in the ear canal of the user when the connector is in its intended position at the ear of the user.

The connector further comprises at least one identifiable marker being a user guide. The identifiable marker is a user guide because it is configured to guide the user to insert the ITE component in the ear. The identifiable marker may have a length in the range of 1 mm to 60 mm. The identifiable marker may have a length in the range of 2 mm to 30 mm. The identifiable marker may have a length in the range of 4 mm to 15 mm. The identifiable marker may have a length in the range of 6 mm to 10 mm e.g. 8 mm.

The advantage of the at least one identifiable marker of the connector is that it assists the user to distinguish, identify or locate the connector from other things e.g. other components of the hearing device. The wires and/or sound tubes of the hearing devices are often designed to be inconspicuous e.g transparent. The at least one identifiable marker of the connector allows the user to identify the at least one identifiable marker of the connector and hence the connector by at least one of the human senses such as vision or touch. Thereby, the at least one identifiable marker of the connector allows the user to identify and locate the connector by e.g. seeing the connector or by e.g. feeling the connector without looking. The identification of the connector from e.g. other components of the hearing device or even from hair that may cover the connector also assists the user to successfully grip the connector and to successfully insert the connector into her/his ear canal or to successfully remove the connector from her/his ear canal. In addition, the at least one identifiable marker assists the user to control an insertion, such as an insertion depth, of the ITE component into her/his ear canal. For instance, the user may visually or tactilely sense and inspect the at least one identifiable marker to control an insertion of the ITE component in her/his ear canal. Hence, the at least one identifiable marker of the connector allows the user to obtain an optimum insertion for the ITE component. This in turn allows the user to receive an optimal performance of the hearing device.

Another advantage of the at least one identifiable marker of the connector is that it assists users with a reduced ability such as a reduced dexterity and/or a low vision e.g. color blindness. Thereby, the at least one identifiable marker of the connector assists such users to distinguish, identify or locate the connector by visually or tactilely sensing and inspecting the at least one identifiable marker of the connector. For instance, the at least one identifiable marker of the connector may have a different surface roughness which may assist the users with the reduced dexterity to find a good grip of the connector. Hence, such users may also successfully distinguish, identify or locate the connector of the hearing device. In addition, such users may also successfully grip the connector and successfully insert the ITE component of the hearing device into their ear canal by inserting the at least one identifiable marker. Thereby, the at least one identifiable marker of the connector also allows the users with the reduced ability to control an insertion of the ITE component and to obtain an optimum insertion for the ITE component. Hence, the at least one identifiable marker of the connector also allows the users with the reduced ability to receive an optimal performance of the hearing device.

For example, the connector may comprise a visual identifiable marker at the first portion of the connector. The visual identifiable marker acts as a visual user guide. The visual identifiable marker allows the user to see and hence to distinguish, identify or locate the first portion of the connector i.e. the connector. Thereby, the visual identifiable marker of the connector assists the user to grip and to insert the ITE component into her/his ear canal. For instance, the visual identifiable marker may be arranged at a portion of the first portion and may be configured to be inserted into the ear canal of the user. Thereby, the user may control an insertion of the ITE component in her/his ear canal by controlling the visual identifiable marker e.g. by visual sensing/visual inspection of the visual identifiable marker of the connector. Hence, the user may control the insertion of the ITE component while being inserted into the ear canal until the visual identifiable marker is completely inserted into the ear canal of the user. Therefore, the visual identifiable marker of the connector assists the user to obtain an optimum insertion for the ITE component and hence an optimal performance of the hearing device.

Yet another advantage of the at least one identifiable marker of the connector is that it allows for a flexible and user-friendly connector since the at least one identifiable marker of the connector may be designed based on the user's needs or desires. For example, a user may be color blind and may prefer visual identifiable markers i.e. visual user guides with a certain color.

In an embodiment, a hearing device is configured to be worn by a user. The hearing device may be arranged at the user's ear, in the user's ear, in the user's ear canal, behind the user's ear and/or in the user's concha, i.e., the hearing device is configured to be worn at, in, and/or behind the user's ear. The user may wear two hearing devices, one hearing device at each ear. The two hearing devices may be connected, such as wirelessly connected and/or connected by wires, such as a binaural hearing aid system.

The hearing device may be a hearable such as a earphone, earbud, hearing aid, a personal sound amplification product (PSAP), an over-the-counter (OTC) hearing device, a hearing protection device, a one-size-fits-all hearing device, a custom hearing device or another head-wearable hearing device. Hearing devices can include both prescription devices and non-prescription devices.

The hearing device may be configured for audio communication, e.g. enabling the user to listen to media, such as music or radio, and/or enabling the user to perform phone calls. The hearing device may be configured for performing hearing compensation for the user. The hearing device may be configured for performing noise cancellation etc.

The hearing device may be embodied in various housing styles or form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE component configured to be worn behind the ear of the user and an in the ear (ITE) component configured to be inserted partly or fully into the user's ear canal. Generally, the BTE component may comprise at least one input transducer, a power source and a processing unit. The term BTE hearing device refers to a hearing device where the receiver, i.e. the output transducer, is comprised in the BTE component and sound is guided to the ITE component via a sound tube or a connector connecting the BTE and ITE components, whereas the terms RIE, RIC and MaRIE hearing devices refer to hearing devices where the receiver may be comprise in the ITE component, which is coupled to the BTE component via a cable, a connector or wire configured for transferring electric signals between the BTE and ITE components.

Some of these form factors are In-the-Ear (ITE) hearing device, Completely-in-Canal (CIC) hearing device or Invisible-in-Canal (IIC) hearing device. These hearing devices may comprise an ITE component, wherein the ITE component may comprise at least one input transducer, a power source, a processing unit and an output transducer. These form factors may be custom devices, meaning that the ITE component may comprise a housing having a shell made from a hard material, such as a hard polymer or metal, or a soft material such as a rubber-like polymer, molded to have an outer shape conforming to the shape of the specific user's ear canal.

The person skilled in the art is well aware of different kinds of hearing devices and of different options for arranging the hearing device in, behind and/or at the ear of the hearing device wearer. The hearing device (or pair of hearing devices) may be custom fitted, standard fitted, open fitted and/or occlusive fitted.

In an embodiment, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls.

In an embodiment, the wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing device, e.g., as part of a binaural hearing system and/or from one or more accessory device(s), such as a smartphone and/or a smart watch.

In an embodiment, the hearing device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

In an embodiment, the hearing device may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an ITE component, e.g. Receiver-in-Ear (RIE) unit or Microphone-and-Receiver-in-Ear (MaRIE) unit, of the hearing device. One or more of the input transducer(s) may be comprised in an ITE unit or in an ITE component.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the hearing device may comprise a digital-to-analogue converter configured to convert the first electric output signal, the second electric output signal and/or the wireless output signal into an analogue signal.

In an embodiment, the hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the hearing device may comprise a memory, including volatile and non-volatile forms of memory.

In some embodiments, the connector further comprises a second portion. The second portion is configured to be connected to the BTE component of the hearing device. The second portion is configured to be at least partly arranged at a front edge of the pinna of the ear of the user when the connector is in its intended position at the ear of the user. The connector further comprises a third portion. The third portion connects the first portion and the second portion. The third portion is configured to extend along the ear of the user. The at least one identifiable marker is arranged at one or more of the first portion, the second portion or the third portion of the connector.

The second portion of the connector may be configured to be connected to the BTE component of the hearing device. The second portion of the connector may be connected to the BTE component by a plug-and-socket connector or the like.

The second portion of the connector may be configured to be at least partly arranged at the front edge of the pinna of the ear of the user when the connector is in its intended position at the ear of the user. The second portion of the connector may be configured to be at least partly arranged at the front of the pinna of the ear of the user when the connector is in its intended position at the ear of the user. The second portion of the connector may have a length in the range of 5 mm to 30 mm. The second portion of the connector may be configured to be at least partly arranged behind the pinna of the ear of the user of the hearing device when the connector is in its intended position at the ear of the user. The second portion of the connector may be configured such that a portion of the second portion of the connector, having a length in the range of 0 mm to 15 mm may be configured to be at least partly arranged at the front edge of the pinna of the ear of the user when the connector is in its intended position at the ear of the user. The second portion of the connector may be configured such that a portion of the second portion of the connector, having a length in the range of 0 mm to 15 mm may be configured to be at least partly arranged at the front of the pinna of the ear of the user when the connector is in its intended position at the ear of the user. The second portion of the connector may be configured such that a portion of the second portion of the connector, having a length in the range of 5 mm to 30 mm, may be configured to be at least partly arranged behind the pinna of the ear of the user of the hearing device when the connector is in its intended position at the ear of the user. The second portion of the connector may be configured to be completely arranged at the front edge of the pinna of the ear of the user when the connector is in its intended position at the ear of the user.

The third portion of the connector may connect the first portion and the second portion. The third portion may be connected to the first portion and the second portion by the connector being a continuous component.

The third portion may be configured to extend along the ear of the user when the connector is in its intended position at the ear. The third portion of the connector may extend from the front edge of the pinna of the ear of the user to an opening of the ear canal of the user of the hearing device when the connector is in its intended position at the ear of the user. The third portion of the connector may have a length in the range of 5 mm to 50 mm.

The connector may have a first bend. The first bend may be arranged between the first portion and the third portion of the connector. The first bend may have a length in the range of 5 mm to 15 mm. The first bend may have an angle in the range of 45 degrees to 140 degrees with respect to the first portion and the third portion of the connector such as. In other words, there may be an angle in the range of 45 degrees to 140 degrees between the first portion and the third portion of the connector. The connector may have a second bend. The second bend may be arranged between the second portion and the third portion of the connector. The second bend may have a length in the range of 5 mm to 15 mm. The second bend may have an angle in the range of 45 degrees to 140 degrees with respect to the second portion and the third portion of the connector. In other words, there may be an angle in the range of 45 degrees to 140 degrees between the second portion and the third portion of the connector.

The at least one identifiable marker may be arranged at one or more of the first portion, the second portion or the third portion of the connector. The at least one identifiable marker may be arranged at the first portion of the connector. The at least one identifiable marker may be arranged at at least a portion of the first portion of the connector. The at least one identifiable marker may be arranged at the second portion of the connector. The at least one identifiable marker may be arranged at at least a portion of the second portion of the connector. The at least one identifiable marker may be arranged at the third portion of the connector. The at least one identifiable marker may be arranged at at least a portion of the third portion of the connector. The at least one identifiable marker may be arranged at the first portion and the second portion of the connector. The at least one identifiable marker may be arranged at at least a portion of the first portion and at least a portion of the second portion of the connector. The at least one identifiable marker may be arranged at the first portion and the third portion of the connector. The at least one identifiable marker may be arranged at at least a portion of the first portion and at least a portion of the third portion of the connector. The at least one identifiable marker may be arranged at the second portion and the third portion of the connector. The at least one identifiable marker may be arranged at at least a portion of the second portion and at least a portion of the third portion of the connector. The at least one identifiable marker may be arranged at the first portion, the second portion and third portion of the connector. The at least one identifiable marker may be arranged at at least a portion of the first portion, at least a portion of the second portion and at least a portion of the third portion of the connector. The at least one identifiable marker may be arranged at the first bend of the connector. The at least one identifiable marker may be arranged at at least a portion of the first bend of the connector. The at least one identifiable marker may be arranged at the second bend of the connector. The at least one identifiable marker may be arranged at at least a portion of the second bend of the connector. The at least one identifiable marker may be arranged at the first bend and at the second bend of the connector. The at least one identifiable marker may be arranged at at least a portion of the first bend and at at least a portion of the second bend of the connector.

The connector may comprise more than one identifiable marker. The more than one identifiable marker may be arranged at one or more of the first portion, the second portion or the third portion of the connector. The more than one identifiable marker may be arranged at the first portion of the connector. The more than one identifiable marker may be arranged at at least a portion of the first portion of the connector. For example, a portion of the first portion of the connector may have one identifiable marker and another portion of the first portion of the connector may have another identifiable marker. The more than one identifiable marker may be arranged at the second portion of the connector. The more than one identifiable marker may be arranged at at least a portion of the second portion of the connector. For example, a portion of the second portion of the connector may have one identifiable marker and another portion of the second portion of the connector may have another identifiable marker. The more than one identifiable marker may be arranged at the third portion of the connector. The more than one identifiable marker may be arranged at at least a portion of the third portion of the connector. For example, a portion of the third portion of the connector may have one identifiable marker and another portion of the third portion of the connector may have another identifiable marker. The more than one identifiable marker may be arranged at the first portion and the second portion of the connector. The more than one identifiable marker may be arranged at at least a portion of the first portion and at least a portion of the second portion of the connector. For example, the connector may have two identifiable markers. One of the two identifiable markers may be arranged at the first portion of the connector. Another one of the two identifiable markers may be arranged at the second portion of the connector. The more than one identifiable marker may be arranged at the first portion and the third portion of the connector. The more than one identifiable marker may be arranged at at least a portion of the first portion and at least a portion of the third portion of the connector. For example, the connector may have two identifiable markers. One of the two identifiable markers may be arranged at the first portion of the connector. Another one of the two identifiable markers may be arranged at the third portion of the connector. The more than one identifiable marker may be arranged at the second portion and the third portion of the connector. The more than one identifiable marker may be arranged at at least a portion of the second portion and at least a portion of the third portion of the connector. For example, the connector may have two identifiable markers. One of the two identifiable markers may be arranged at the second portion of the connector. Another one of the two identifiable markers may be arranged at the third portion of the connector. The more than one identifiable marker may be arranged at the first portion, the second portion and third portion of the connector. The more one identifiable marker may be arranged at at least a portion of the first portion, at least a portion of the second portion and at least a portion of the third portion of the connector. For example, the connector may have three identifiable markers. One of the three identifiable markers may be arranged at the first portion of the connector. Another one of the three identifiable markers may be arranged at the second portion of the connector. Yet another one of the three identifiable markers may be arranged at the third portion of the connector. The more one identifiable marker may be arranged at the first bend of the connector. The at least one identifiable marker may be arranged at at least a portion of the first bend of the connector. For example, a portion of the first bend of the connector may have one identifiable marker and another portion of the first bend of the connector may have another identifiable marker. The at least one identifiable marker may be arranged at the second bend of the connector. The at least one identifiable marker may be arranged at at least a portion of the second bend of the connector. For example, a portion of the second bend of the connector may have one identifiable marker and another portion of the second bend of the connector may have another identifiable marker. The at least one identifiable marker may be arranged at the first bend and at the second bend of the connector. The at least one identifiable marker may be arranged at at least a portion of the first bend and at at least a portion of the second bend of the connector. For example, the connector may have two identifiable markers. One of the two identifiable markers may be arranged at the first bend of the connector. Another one of the two identifiable markers may be arranged at the second bend of the connector. The more than one identifiable markers of the connector may be similar. The more than one identifiable markers of the connector may be different.

For example, the connector may comprise two identifiable markers. The connector may comprise a first visual identifiable marker at the first portion of the connector. The connector may also comprise a second tactile identifiable marker at the third portion of connector. The first visual identifiable marker acts as a visual user guide and assists the user to distinguish, identify or locate the connector. The first visual identifiable marker further assists the user to control an insertion of the ITE component in her/his ear canal by controlling the first visual identifiable marker. The second tactile identifiable marker acts as a tactile user guide and also assists the user to distinguish identify or locate the connector. The second tactile marker also assists the user to find a good grip of the connector which may otherwise be hard to manipulate. Thereby, the user may successfully identify, locate, grip and insert the ITE component of the hearing device in her/his ear canal by visually inspecting the first visual identifiable marker until a desired insertion of the ITE component in the ear canal of the user is achieved. Hence, the first visual and the second tactile identifiable markers of the connector assists the user to obtain an optimum insertion for the ITE component and hence an optimal performance of the hearing device. The second tactile identifiable marker further assists the user to remove the ITE component from her/his ear canal when desired.

An advantage of more than one identifiable marker of the connector is that it allows for a flexible and user-friendly connector since the at least one identifiable marker of the connector may be designed based on the user's needs or desires. For example, the user may prefer having identifiable markers at the first portion and/or at the third portion. Therefore, a connector comprising the at least one identifiable marker at the first portion and/or at the third portion may be designed and produced for such user accordingly.

In some embodiments, the at least one identifiable marker is non-removable. Thereby, the at least one identifiable marker may not be removed. Examples of advantages of the at least one identifiable marker being non-removable is that the at least one identifiable marker may be durable, and visibly discreet during use.

In some embodiments, the at least one identifiable marker is configured for controlling an insertion depth of the ITE component into the ear canal of the user. Therefore, the user may control the insertion depth of the ITE component by inspecting the at least one identifiable marker. For example, the connector may comprise a visual identifiable marker at the first portion of the connector indicating a portion of the first portion of the connector to be inserted in the ear canal of the user. Therefore, the user may inspect the visual identifiable marker while inserting the ITE component and the portion of the first portion until the user achieves the desired insertion depth. Hence, the at least one identifiable marker of the connector may assist the user to obtain an optimum insertion depth of the ITE component and hence an optimal performance of the hearing device.

In some embodiments, the at least one identifiable marker of the connector comprises a pattern of any of or any combination of color, mesh, transparency, fabric, texture, surface roughness or shape. Thereby, the at least one identifiable marker may comprise various patterns which may be chosen based on the needs or desires of the user of the connector. By the term "pattern" is hereby meant a particular way in which the at least one identifiable marker is arranged or formed at, in and/or on the connector. The at least one identifiable marker of the connector may comprise a repetitive pattern. The at least one identifiable marker of the connector may comprise a regularly repetitive pattern. The at least one identifiable marker of the connector may comprise a non-repetitive pattern. The at least one identifiable marker of the connector may comprise a combination of a repetitive pattern and a non-repetitive pattern. The at least one identifiable marker of the connector may comprise a pattern of color of any color such as red, blue or green. The at least one identifiable marker of the connector may comprise a pattern of any fabric such as a grid-like fabric. The at least one identifiable marker of the connector may comprise a pattern of any texture such as a weave-like texture. The at least one identifiable marker of the connector may comprise a pattern of any surface roughness such as a sandy surface or a gritty surface. The at least one identifiable marker of the connector may comprise a pattern of any shape such as stripes or dots.

In some embodiments, the at least one identifiable marker comprises a tactile pattern. Thereby, the tactile pattern may tactilely be identifiable. It is an advantage that the tactile pattern may not affect the visual of the connector. The at least one identifiable marker being a tactile pattern may affect transparency of the portion of the connector comprising the at least one identifiable marker. Thereby, the tactile pattern may allow the connector to comprise at least a semi-transparent color, as the tactile pattern may keep its presence discrete and elegant.

In some embodiments, the tactile pattern is formed on an exterior surface of the connector, thereby improving a grip of the connector for the user when inserting the ITE component of the hearing device. Thereby, the tactile pattern on the exterior surface of the connector may make it easier for user to grip the connector and to locate the connector by feel without looking. In addition, the tactile pattern on the exterior surface of the connector may further assist the user with distinguishing the connector from other things such as other components of the hearing device or even from hair that may cover the connector when removing the connector from the ear. Furthermore, the connector may comprise different tactile patterns of e.g. equal length on different portions of the connector which may further assist the user to identify and locate different portions of the connector. The tactile pattern may be carved or embossed on the connector.

In some embodiments, the at least one identifiable marker comprises a visual pattern. Thereby, the visual pattern may be visually identifiable. It is an advantage that the at least one identifiable marker comprising a visual pattern may further assist the user to distinguish the connector on an image or in a mirror faster. For example, the at least one identifiable marker may comprise a pattern of colored stripes at the first portion of the connector indicating an optimal insertion depth of the ITE component in the ear canal of the user. Thereby, the visual pattern of the at least one identifiable marker may further assist the user to evaluate the insertion depth of the ITE component and to obtain an optimum insertion depth and to hence an optimal performance of the hearing device.

In some embodiments, the at least one identifiable marker may comprise a combination of a visual pattern and a tactile pattern. For instance, the connector may comprise a visual pattern where the connector is in direct contact with the skin of the user and may have a tactile pattern where the connector is not in direct contact with the skin of the user.

In some embodiments, the visual pattern comprises a visible-spectrum pattern. Thereby, the visual pattern comprising a visual-spectrum pattern may be visible to human eye. Hence, the user may see the visible pattern by her/his eyes and may inspect the insertion depth of the connector by e.g. looking at a mirror or a photo. The visible-spectrum pattern may have a visible light spectrum with a wavelength in the range of about 380 to about 780 nm.

In some embodiments, the visual pattern comprises a non-visible-spectrum pattern. Thereby, the visual pattern comprising a non-visual-spectrum pattern may not be visible to human eye. It is advantage that the non-visual-spectrum pattern may not affect the appearance of the connector i.e. maintain the connector inconspicuous, as it is not visible to human eye. For example, the connector may comprise a non-visible-spectrum pattern at the third portion of the connector. The non-visible-spectrum pattern may have a non-visible light spectrum such as ultraviolet light or infrared light. The non-visible-spectrum pattern may have a wavelength below about 380 nm or above about 780 nm. The non-visible-spectrum pattern may become visible to human eye when looked through a e.g. a camera or a phone camera responsive to non-visible spectrum patterns e.g. infrared or ultraviolet. Thereby, the user may see the non-visible pattern when looking through such camera and may hence inspect the insertion depth of the connector.

In some embodiments, the visual pattern is a painted pattern. Thereby, the visual pattern may be painted on the connector e.g. on an exterior surface of the connector. The visual pattern may comprise a painted pattern with a visible light spectrum. The visual pattern may comprise a painted pattern with a non-visible light spectrum. The visual pattern may be painted with any color.

In some embodiments, the connector comprises a transparent casing arranged on an exterior surface of the connector such that the transparent casing encloses the visual pattern. Thereby, the transparent casing arranged on the exterior surface of the connector may prevent or at least mitigate potential allergic reactions that may otherwise be caused by the direct contact of the painted pattern with the skin of the user. In addition, the transparent casing arranged on the exterior surface of the connector may prolong a life time of the visual pattern, as the pattern may not be removed due to e.g. direct contact with other surfaces.

In some embodiments, the connector may be made of transparent plastic. The connector may be made of a flexible transparent plastic. The connector may be made of any other suitable material e.g. resin, thermoplastic, silicone, or other examples of flexible material.

According to a second aspect, disclosed is a hearing device. The hearing device comprises a behind-the-ear, BTE, component. The BTE component is configured to be arranged behind an ear of a user, when the user is wearing the hearing device in its intended position. The hearing device further comprises an ITE component. The ITE component is configured to be arranged into an ear canal of the user when the user is wearing the hearing device in its intended position. The hearing device further comprises a connector, according to the first aspect. The connector is configured to connect the BTE component of the hearing device to the ITE component of the hearing device. The second aspect generally present the same or corresponding advantages as the first aspect.

According to a third aspect, disclosed is a method of inserting an ITE component of a hearing device according to the second aspect into an ear canal of a user. The method comprises the steps of identifying the connector of the hearing device, inserting the ITE component of the hearing device into the ear canal of the user, and controlling an insertion depth of the ITE component in the ear canal of the user. The third aspect generally present the same or corresponding advantages as the first aspect. The user may be taught about an optimal insertion depth of her/his ITE component during a visit with a hearing specialist. Therefore, the user may be taught about how to control the insertion depth of the ITE component by the hearing specialist.

In some embodiments, the step of controlling the insertion depth of the ITE component comprises tactilely sensing the at least one identifiable marker. Therefore, the user may tactilely sense i.e. feel the at least one identifiable marker of the connector without looking. Alternatively or in combination, step of controlling the insertion depth of the ITE component may comprise visually sensing the at least one identifiable marker of the connector by looking at a mirror or at a photo taken by a camera as long as the at least one identifiable marker may be seen. This in turn may allow the user to obtain an optimum insertion for the ITE component and hence an optimal performance of the hearing device.

In some embodiments, the step of controlling the insertion depth of the ITE component comprises visually sensing the at least one identifiable marker. Therefore, the user may visually sense i.e. see the at least one identifiable marker of the connector. The step of controlling the insertion depth of the ITE component may comprise looking at a mirror or at a photo taken by any camera when the at least one identifiable marker comprises a visible-spectrum visual pattern. The step of controlling the insertion depth of the ITE component may comprise looking through a camera responsive to non-visible visual patterns when the at least one identifiable marker comprises a non-visible-spectrum visual pattern. This in turn may allow the user to obtain an optimum insertion for the ITE component and hence an optimal performance of the hearing device.

The present disclosure relates to different aspects including the connector, the hearing device and the method of inserting an ITE component into an ear canal of a user, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which:

FIG. 2 schematically illustrates that the exemplary hearing device 10 comprises a BTE component 300, an ITE component 200 and a connector 100 comprising an identifiable marker 150.

DETAILED DESCRIPTION

Figure 1:
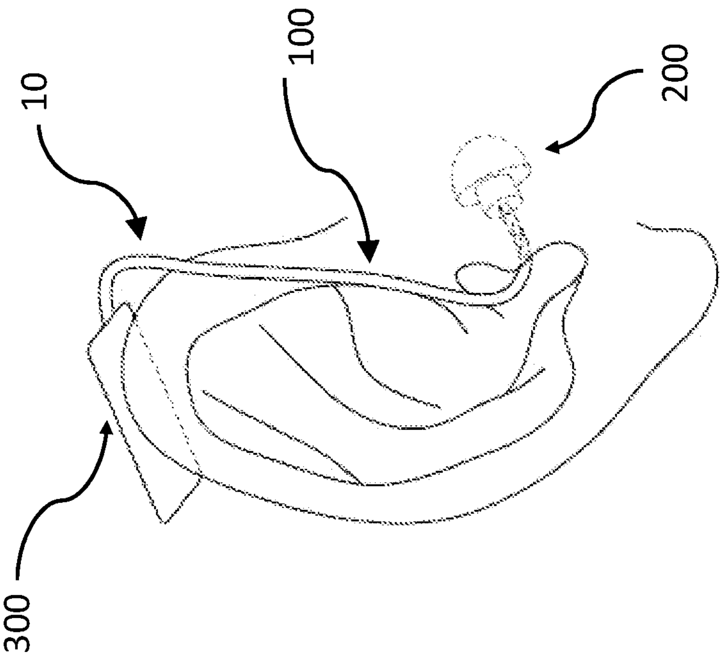
FIG. 1 schematically illustrates an exemplary hearing device 10 worn at an ear of a user.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates an exemplary hearing device 10 worn at an ear of a user. The hearing device 10, shown in FIG. 1, comprises a BTE component 300. The BTE component 300 is arranged behind an ear of a user, as the user is wearing the hearing device 10 in its intended position. The hearing device 10, shown in FIG. 1, further comprises an ITE component 200. The ITE component 200 is arranged into an ear canal of the user, as the user is wearing the hearing device 10 in its intended position. The ITE component 200, shown in FIG. 1, is a sound outlet comprising a dome. The ITE component 200 may be an ITE component of the hearing device. The hearing device 10, shown in FIG. 1, further comprises a connector 100. FIG. 1 shows that the connector 100 connects the BTE component 300 of the hearing device 10 to the ITE component 200 of the hearing device 10.

Figure 2:
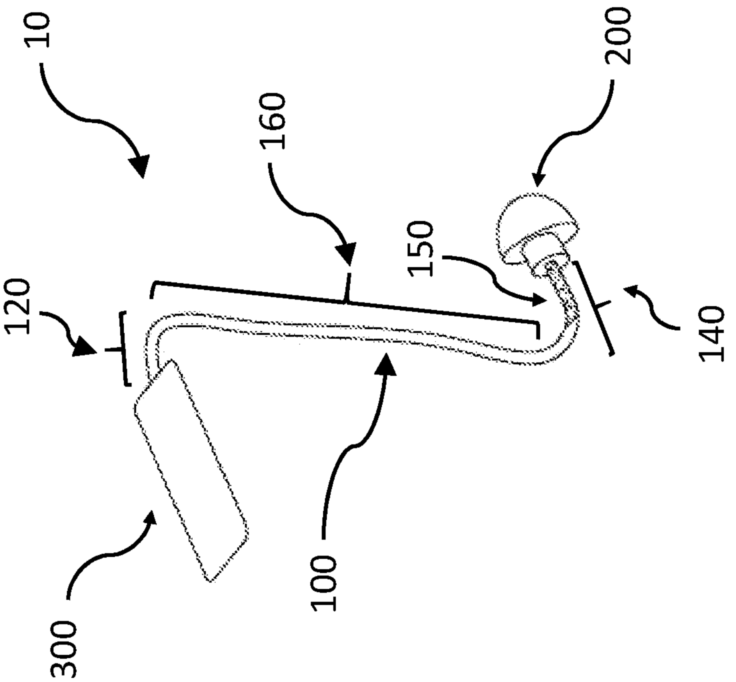
FIG. 2 schematically illustrates the exemplary hearing device 10, shown in FIG. 1, not worn at the ear of the user.

FIG. 2 schematically illustrates the exemplary hearing device 10, shown in FIG. 1, not worn at the ear of the user. The connector 100, shown in FIG. 2, comprises a first portion 140. The first portion 140 is configured to be connected to the ITE component 200 of the hearing device 10. FIG. 2 shows that the first portion 140 is connected to the ITE component 200 of the hearing device 10. The first portion 140 is configured to be at least partly inserted into an ear canal of the user. The first portion 140 is configured to extend at least partly in the ear canal of the user when the connector 100 is in its intended position at the ear of the user, as shown in FIG. 1.

FIG. 2 further shows that the connector 100 comprises a second portion 120. The second portion 120 is configured to be connected to the BTE component 300 of the hearing device 10. FIG. 2 shows that the second portion 120 is connected to the BTE component 300 of the hearing device 10. The second portion 120 is configured to be at least partly arranged at a front edge of a pinna of the ear of the user when the connector 100 is in its intended position at the ear of the user, as shown in FIG. 1.

FIG. 2 further shows that the connector 100 comprises a third portion 160. The third portion 160 connects the first portion 140 and the second portion 120. The third portion 160 is configured to extend along the ear of the user, as shown in FIG. 1. The connector 100 further comprises at least one identifiable marker 150, 152, 154, 156, 158 being a user guide. FIG. 2 shows that the connector 100 comprises one identifiable marker 150 arranged at the first portion 140 of the connector 100. The at least one identifiable marker 150, 152, 154, 156, 158 may comprise a pattern of any of or any combination of color, mesh, transparency, fabric, texture, surface roughness or shape. The at least one identifiable marker 150, 152, 154, 156, 158 may comprise a tactile pattern. The tactile pattern may be formed on an exterior surface of the connector 100. The identifiable marker 150 may be a tactile pattern in the form of a surface roughness. The identifiable marker 150 may be a visual pattern e.g. a visible-spectrum painted pattern. The identifiable marker 150 may be a non-visible spectrum painted pattern.

Figure 3:
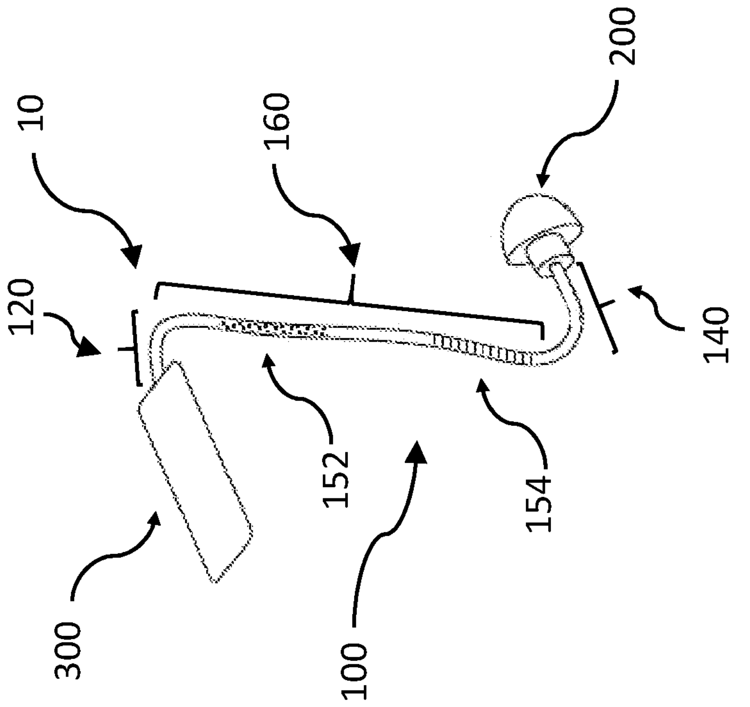
FIGS. 3 and 4 schematically illustrate the exemplary hearing device 10, shown in FIG. 2, comprising two respective other exemplary connectors 100. The connector 100 of each hearing device 10 comprises two identifiable markers 152, 154, 156 and 158.
Figure 4:
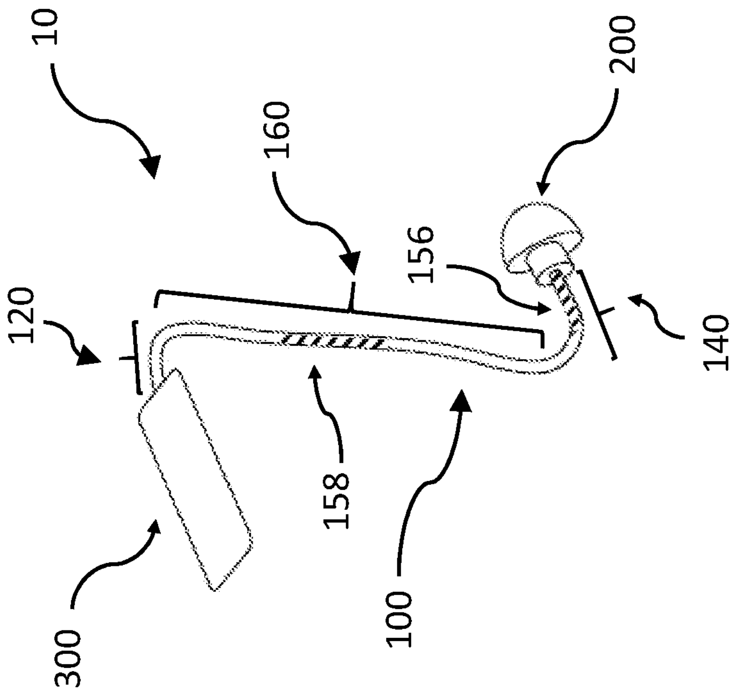

FIGS. 3 and 4 schematically illustrate the exemplary hearing device 10, shown in FIG. 2, comprising two respective other exemplary connectors 100. The connector 100 of each hearing device 10 comprises two identifiable markers 152, 154, 156 and 158.

FIG. 3 shows that the connector 100 comprises two identifiable markers 152 and 154 which are arranged at the third portion 160 of the connector 10. FIG. 3 further shows that the two identifiable markers 152 and 154 comprise two different patterns. The two different patterns 152 and 154, shown in FIG. 3, comprise two different shapes. FIG. 3 shows that the identifiable marker 152 comprises a pattern of dots. FIG. 3 further shows that the identifiable marker 154 comprises a pattern of stripes. The two identifiable markers 152 and 154, shown in FIG. 3, may comprise a tactile pattern. The two identifiable markers 152 and 154, shown in FIG. 3, may comprise a visual pattern. One of the two identifiable markers 152 and 154 may be a tactile pattern and another one of the two identifiable markers 152 and 154 may be a visual pattern.

FIG. 4 shows that the connector 100 comprises two identifiable markers 156 and 158 which are respectively arranged at the first portion 140 and the third portion 160 of the connector 10. FIG. 4 further shows that the two identifiable markers 156 and 158 comprise two similar patterns. The two different patterns 152 and 154, shown in FIG. 3, comprise two patterns of stripes. The two identifiable markers 156 and 158, shown in FIG. 4, may comprise a tactile pattern. The two identifiable markers 156 and 158, shown in FIG. 4, may comprise a visual pattern. One of the two identifiable markers 156 and 158 may be a tactile pattern and another one of the two identifiable markers 156 and 158 may be a visual pattern.

Figure 5:
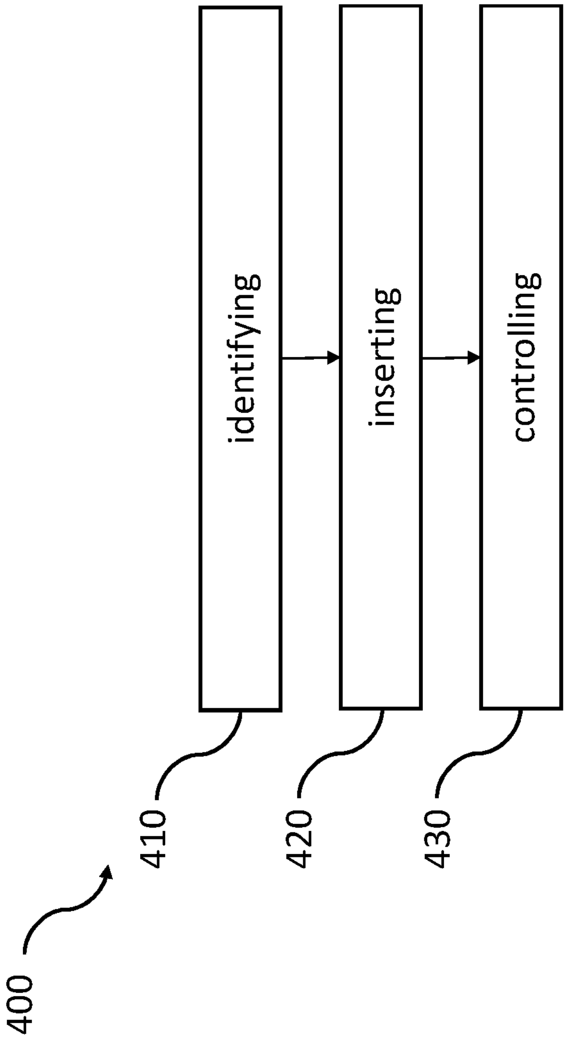
FIG. 5 schematically illustrates steps of a method 400 of inserting an ITE component 200 of a hearing device 10.

FIG. 5 schematically illustrates steps of a method 400 of inserting an ITE component 200 of a hearing device 10. FIG. 5 shows that the method 400 comprises the step of identifying 410 the connector 100 of the hearing device 10. FIG. 5 shows that the method 400 further comprises the step of inserting 420 the ITE component 200 of the hearing device 10 into the ear canal of the user. FIG. 5 shows that the method 400 further comprises the step of controlling 430 an insertion depth of the ITE component 200 in the ear canal of the user. The step of controlling 430 the insertion depth of the ITE component 200 may comprise tactilely sensing the at least one identifiable marker 150, 152, 154, 156, 158. The step of controlling 430 the insertion depth of the ITE component 200 may comprise visually sensing the at least one identifiable marker 150, 152, 154, 156, 158.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. A connector (100) for providing sound into an ear canal of a user, the connector being configured to connect a behind-the-ear, BTE, component (300) of a hearing device (10) to an in-the-ear, ITE, component (200) of the hearing device (10), the connector (100) comprising:
   a first portion (140) configured to be connected to the ITE component (200) of the hearing device (10) and configured to be at least partly inserted into an ear canal of the user, wherein the first portion (140) is configured to extend at least partly in the ear canal of the user when the connector (100) is in its intended position at the ear of the user,
   wherein the connector (100) comprises at least one identifiable marker (150, 152, 154, 156, 158) being a user guide.
2. The connector (100) according to item 1, wherein the connector (100) further comprising:
   a second portion (120) configured to be connected to the BTE component (300) of the hearing device (10) and configured to be at least partly arranged at a front edge of a pinna of the ear of the user when the connector (100) is in its intended position at the ear of the user,
   a third portion (160) connecting the first portion (140) and the second portion (120) and configured to extend along the ear of the user,
   wherein the at least one identifiable marker (150, 152, 154, 156, 158) is arranged at one or more of the first portion (140), the second portion (120) or the third portion (160) of the connector (100).
3. The connector (100) according to item 1 or 2, wherein the at least one identifiable marker (150, 152, 154, 156, 158) is non-removable.
4. The connector (100) according to any of the preceding items, wherein the at least one identifiable marker (150, 152, 154, 156, 158) is configured for controlling an insertion depth of the ITE component (200) into the ear canal of the user.
5. The connector (100) according to any of the preceding items, wherein the at least one identifiable marker (150, 152, 154, 156, 158) comprises a pattern of any of or any combination of color, mesh, transparency, fabric, texture, surface roughness or shape.
6. The connector (100) according to any of the preceding items, wherein the at least one identifiable marker (150, 152, 154, 156, 158) comprises a tactile pattern.
7. The connector (100) according to item 6, wherein the tactile pattern is formed on an exterior surface of the connector (100), thereby improving a grip of the connector (100) for the user when inserting (420) the ITE component (200) of the hearing device (10).
8. The connector (100) according to any of the items 1-5, wherein the at least one identifiable marker (150, 152, 154, 156, 158) comprises a visual pattern.
9. The connector (100) according to item 8, wherein the visual pattern comprises a visible-spectrum pattern.
10. The connector (100) according to item 8, wherein the visual pattern comprises a non-visible-spectrum pattern.
11. The connector (100) according to any of the items 8-10, wherein the visual pattern is a painted pattern.
12. The connector (100) according to any of the items 8-11, wherein the connector (100) comprises a transparent casing arranged on an exterior surface of the connector (100) such that the transparent casing encloses the visual pattern.
13. The connector (100) according to any of the preceding items, wherein the connector (100) is made of transparent plastic.
14. A hearing device (10) comprising:
   a behind-the-ear, BTE, component (300) being configured to be arranged behind an ear of a user, when the user is wearing the hearing device (10) in its intended position,
   an in-the-ear, ITE, component (200) being configured to be arranged into an ear canal of the user when the user is wearing the hearing device (10) in its intended position, and
   a connector (100) according to any of the preceding items, the connector (100) being configured to connect the BTE component (300) of the hearing device (10) to the ITE component (200) of the hearing device (10).
15. A method (400) of inserting an ITE component (200) of a hearing device (10) according to item 14 into an ear canal of a user, the method (400) comprising the steps of:
   identifying (410) the connector (100) of the hearing device (10),
   inserting (420) the ITE component (200) of the hearing device (10) into the ear canal of the user, and
   controlling (430) an insertion depth of the ITE component (200) in the ear canal of the user.
16. The method (400) according to item 15, wherein the step of controlling (430) the insertion depth of the ITE component (200) comprises tactilely sensing the at least one identifiable marker (150, 152, 154, 156, 158).

17. The method (400) according to item 15, wherein the step of controlling (430) the insertion depth of the ITE component (200) comprises visually sensing the at least one identifiable marker (150, 152, 154, 156, 158).

LIST OF REFERENCES

10 Hearing device
100 Connector
200 In-the-ear component
300 Behind-the-ear component
140 First portion
120 Second portion
160 Third portion
150 Identifiable marker
152 Identifiable marker
154 Identifiable marker
156 Identifiable marker
158 Identifiable marker
400 Method
410 Identifying
420 Inserting
430 Controlling

The invention claimed is:

1. A connector configured to connect a behind-the-ear (BTE) component of a hearing device to an in-the-ear (ITE) component of the hearing device, the connector comprising:
a first portion configured to be connected to the ITE component of the hearing device and configured to be at least partly inserted into an ear canal of a user, wherein the first portion is configured to extend at least partly in the ear canal of the user when the connector is in its intended position with respect to an ear of the user,
wherein the connector comprises an identifiable marker, wherein the identifiable marker is a user guide; and
wherein the identifiable marker is non-removable.

2. A connector configured to connect a behind-the-ear (BTE) component of a hearing device to an in-the-ear (ITE) component of the hearing device, the connector comprising:
a first portion configured to be connected to the ITE component of the hearing device and configured to be at least partly inserted into an ear canal of a user, wherein the first portion is configured to extend at least partly in the ear canal of the user when the connector is in its intended position with respect to an ear of the user,
wherein the connector comprises an identifiable marker, wherein the identifiable marker is a user guide;
wherein the connector further comprises:
a second portion configured to be connected to the BTE component of the hearing device, and configured to be at least partly arranged at a front part of a pinna of the ear of the user when the connector is in its intended position at the ear of the user; and
a third portion between the first portion and the second portion;
wherein the identifiable marker is at the first portion, the second portion, or the third portion of the connector.

3. The connector according to claim 2, further comprising an additional identifiable marker;
wherein the additional identifiable marker is at the first portion, the second portion, or the third portion of the connector.

4. The connector according to claim 1, wherein the identifiable marker is configured to indicate an insertion depth of the ITE component into the ear canal of the user.

5. The connector according to claim 1, wherein the identifiable marker comprises a pattern of any of or any combination of color, mesh, transparency, fabric, texture, surface roughness, or shape.

6. The connector according to claim 1, wherein the marker comprises a tactile pattern.

7. The connector according to claim 6, wherein the tactile pattern is on an exterior surface of the connector, thereby improving a grip of the connector for the user when inserting the ITE component of the hearing device into the ear canal of the user.

8. The connector according to claim 1, wherein the identifiable marker comprises a visual pattern.

9. The connector according to claim 8, wherein the visual pattern comprises a visible-spectrum pattern.

10. A connector configured to connect a behind-the-ear (BTE) component of a hearing device to an in-the-ear (ITE) component of the hearing device, the connector comprising:
a first portion configured to be connected to the ITE component of the hearing device and configured to be at least partly inserted into an ear canal of a user, wherein the first portion is configured to extend at least partly in the ear canal of the user when the connector is in its intended position with respect to an ear of the user,
wherein the connector comprises an identifiable marker, wherein the identifiable marker is a user guide and comprises a visual pattern; and
wherein the visual pattern comprises a non-visible-spectrum pattern.

11. A connector configured to connect a behind-the-ear (BTE) component of a hearing device to an in-the-ear (ITE) component of the hearing device, the connector comprising:
a first portion configured to be connected to the ITE component of the hearing device and configured to be at least partly inserted into an ear canal of a user, wherein the first portion is configured to extend at least partly in the ear canal of the user when the connector is in its intended position with respect to an ear of the user,
wherein the connector comprises an identifiable marker, wherein the identifiable marker is a user guide and comprises a visual pattern; and
wherein the visual pattern is a painted pattern.

12. A connector configured to connect a behind-the-ear (BTE) component of a hearing device to an in-the-ear (ITE) component of the hearing device, the connector comprising:
a first portion configured to be connected to the ITE component of the hearing device and configured to be at least partly inserted into an ear canal of a user, wherein the first portion is configured to extend at least partly in the ear canal of the user when the connector is in its intended position with respect to an ear of the user,
wherein the connector comprises an identifiable marker, wherein the identifiable marker is a user guide and comprises a visual pattern; and
wherein the connector comprises a transparent casing enclosing the visual pattern.

13. The connector according to claim 1, wherein the connector is made of transparent plastic.

14. The connector according to claim 1, wherein the identifiable marker is identifiable by the user to guide the user in a positioning of the connector.

15. A hearing device comprising:

a behind-the-ear (BTE) component configured to be arranged behind an ear of a user, when the user is wearing the hearing device;

an in-the-ear (ITE) component configured to be arranged into an ear canal of the user when the user is wearing the hearing device; and the connector according to claim 1, the connector configured to connect the BTE component of the hearing device to the ITE component of the hearing device.

* * * * *